(12) United States Patent
Knapp

(10) Patent No.: US 7,004,436 B2
(45) Date of Patent: Feb. 28, 2006

(54) FITTING FOR CONNECTING TWO COMPONENTS

(76) Inventor: Friedrich Knapp, Baldhamer Strasse 18, 85591 Vaterstetten (DE)

( * ) Notice: Subject to any disclaimer, the term of this patent is extended or adjusted under 35 U.S.C. 154(b) by 0 days.

(21) Appl. No.: 10/475,366

(22) PCT Filed: Apr. 18, 2002

(86) PCT No.: PCT/DE02/01439

§ 371 (c)(1),
(2), (4) Date: Jun. 21, 2004

(87) PCT Pub. No.: WO02/084129

PCT Pub. Date: Oct. 24, 2002

(65) Prior Publication Data

US 2005/0001117 A1 Jan. 6, 2005

(30) Foreign Application Priority Data

Apr. 18, 2001 (DE) .............................. 101 19 038

(51) Int. Cl.
*A47B 96/06* (2006.01)
(52) U.S. Cl. .......................... 248/220.22; 248/221.11; 248/222.14
(58) Field of Classification Search ........... 248/220.22, 248/222.11, 221.11, 221.12, 222.14, 222.13, 248/225.11, 225.21, 475.1, 489, 200; 52/489.1, 52/489.2

See application file for complete search history.

(56) References Cited

U.S. PATENT DOCUMENTS

| 1,248,363 | A | * | 11/1917 | Malcomson et al. ........ 248/489 |
| 2,105,061 | A | * | 1/1938 | Tate et al. ................... 248/249 |
| 3,117,353 | A | * | 1/1964 | Edwards ...................... 403/403 |
| 3,155,360 | A | * | 11/1964 | Cassells ....................... 248/313 |
| 3,294,355 | A | * | 12/1966 | Topf ............................ 248/467 |
| 4,148,454 | A | * | 4/1979 | Carlson et al. ........ 248/222.11 |
| 4,189,796 | A | * | 2/1980 | Gutner .............................. 5/8 |
| 4,228,982 | A | * | 10/1980 | Sellera ....................... 248/467 |
| 4,457,436 | A | * | 7/1984 | Kelley ...................... 211/88.01 |
| 4,527,762 | A | * | 7/1985 | Duell .................... 248/222.14 |
| 4,719,730 | A | * | 1/1988 | Winkowski ................ 52/238.1 |
| 5,025,937 | A | * | 6/1991 | King .......................... 211/192 |
| 5,284,311 | A | | 2/1994 | Baer |
| 5,961,090 | A | * | 10/1999 | Parkin ..................... 248/475.1 |
| 6,378,828 | B1 | * | 4/2002 | Valiulis et al. ......... 248/231.81 |

FOREIGN PATENT DOCUMENTS

GB 1067187 5/1967

* cited by examiner

*Primary Examiner*—Korie Chan
(74) *Attorney, Agent, or Firm*—Kriegsman & Kriegsman

(57) ABSTRACT

Fitting made from two planar fitting halves (1*a*, 1*b*), for connecting two components (2*a*, 2*b*), screwed to the counterform interlocking fitting halves (1*a*, 1*b*). On a relative longitudinal displacement of the components (2*a*, 2*b*), a locking clip (7), held on the fitting half (1*b*) in a first housing recess (8), by means of a fixing screw (7), folds in the transverse axis and, with a second housing recess (10), surrounds a head (13) of a fixing screw (14), fixed to the other fitting half (1*b*). The above reliably prevents a detachment of the connection in all directions.

3 Claims, 4 Drawing Sheets

FITTING FOR CONNECTING TWO COMPONENTS

The invention concerns a fitment for joining two structural parts, in particular structural parts with large dimensions, which are utilized in building and wood construction in the building of houses. The fitment, however, also can be used for the secure and rational joining of structural parts in other cases of application. Based on its particularly simple construction, the fitment can be easily manufactured in different sizes and in a cost-favorable manner.

The fitment is comprised of two metal fitment halves, each of which is attached to a structural part to be joined, and elements which can be engaged with each other, and which bring about the joining of the structural parts during assembly. Such fitments are sufficiently known to the person skilled in the art from the prior art, e.g., from the document U.S. Pat. No. 5,284,311 and thus will not be explained in further detail here.

For special cases of application, it is necessary that the joining can also be locked, i.e., it is impossible loosen the connection [in a direction] opposite to the coupling motion. A typical application is the construction of buildings in stormy regions and in regions that are threatened by earthquakes, where bearing beams must be reliably joined together. The joining sites must have properties that are not absolutely necessary in conventional buildings. Thus, the joining sites must absorb forces that act opposite to gravitational force, if, for example, a cyclone acts on a roof. In addition, in the above-named cases of application, it is of particular importance that the joining sites have a predetermined elasticity.

The joining constructions known from the prior art are to varying degrees suitable for taking up large forces even in special cases of load, whereby constructions that are solid and can be securely locked are frequently rigid and expensive. A particular disadvantage of conventional joining constructions lies in the fact that locking must be conducted as an additional working step.

Taking into consideration the above-discussed disadvantages of the prior art, it is the object of the invention to create a joining construction for joining structural parts, which guarantees a high functional security even in special cases of load, in conjunction with a self-actuated lock. In addition, the joining construction will be simple, robust, and can be manufactured in a cost-favorable manner.

This object will be solved by a fitment according to patent claim 1.

According to the invention, a fitment will be created for the joining of two structural parts, which [fitment] is comprised of two fitment halves, each of which is attached to a structural part to be joined, and elements which can be engaged with each other and which bring about the non-detachable coupling of the structural parts after the joining operation has been concluded. The fitment halves are plate-shaped. The opposite-lying end segments each have a slot. One end segment is bent back around 180° and the other end segment is bent in or cropped. At the end of the slot, i.e., toward the center of the plate, a recess is provided, e.g., a depression for the uptake of the head of a screw. The end segment that is bent back around 180° has a fastening borehole in the segment of the material that lies opposite the recess. At least one other fastening hole is provided between the end segments of the fitment halves. Both fitment halves are screwed onto the parts to be joined, whereby a fastening screw is provided at each of the slot ends, since it is here that high lever forces may arise. The number and the size of the screws will be determined by the person skilled in the art.

A plate-shaped retaining flap is arranged in the space created by the bend of the end segment of only one of the fitment halves. The retaining flap has a first holding recess for holding the retaining flap in the space of the bend by means of the attachment screw. In a position opposite the first holding recess, in the direction of the longitudinal axis of the retaining flap, a second, larger holding recess is provided. A swivel-point support is formed between the first and the second holding recess. The retaining flap is dimensioned in such a way that when the cropped end segment of the other fitment half is inserted into the space created by the bend, the retaining flap is tilted in the crosswise axis, and thus the second holding recess of the retaining flap encloses the head of a screw which is arranged in the fastening hole and which fastens the other fitment half.

The fitment according to the invention is simple to manufacture and to assemble. The fitment can absorb relatively high forces based on the fastening means that are used. It is particularly advantageous that a locking results automatically by means of the retaining flap that tilts during the coupling movement.

According to claim 2, parallelly aligned chamfers, which facilitate the joining when the fitment halves are oppositely and equally engaged with one another, are provided at the leg ends of the fitment halves, whereby the chamfer of the short end is aligned with the inner space created by the bend of the fitment half.

According to claim 3, the retaining flap is a permanent magnet. In this way, it always assumes an assembly position that is functionally favorable for the coupling.

The invention will be explained in more detail below with reference to particularly advantageous embodiments, which are shown schematically in the appended drawings.

Figure 1:
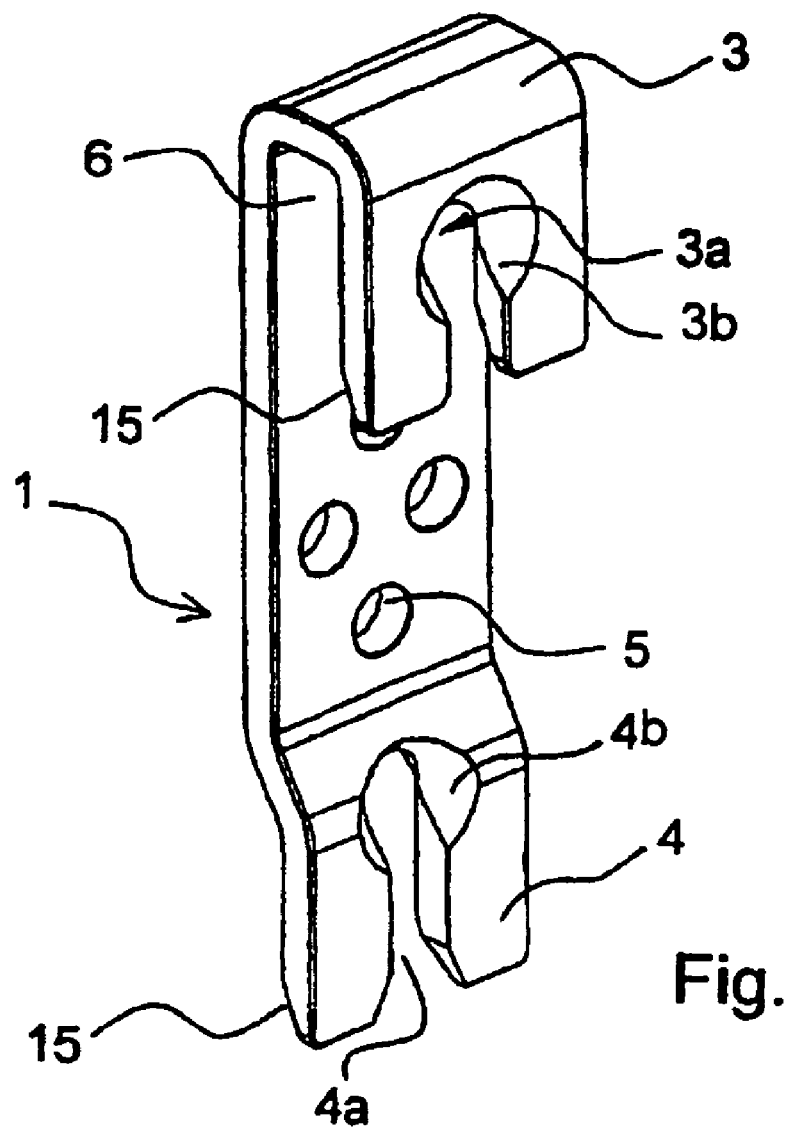
FIG. 1 shows a fitment half.

FIG. 1 shows one of the two equally formed, plate-shaped fitment halves 1a, 1b made of metal for the form-fitting joining that cannot be loosened of two structural parts 2a, 2b (shown in FIG. 4). The fitment halves have an end segment 3 which is bent back around an angle of 180° and has a fastening hole 3a that passes in between two leg ends. A cropped end segment 4 with a longitudinal slot 4a with beveled runout is formed in the position opposite end segment 3. At least one other fastening hole 5, which is spaced apart from fastening hole 3a is provided between the end segments 3, 4 of the fitment half. The bent-back end segment 3 of the fitment half forms an inside space 6 created by the bend. Depressions 3b and 4b are provided for taking up the head of each fastening screw. The shafts of the fastening screws, the heads of which are taken up by the depressions 3b and 4b, in cooperation with the slots, bring about a very stable construction against the application of force from any direction.

Figure 2:
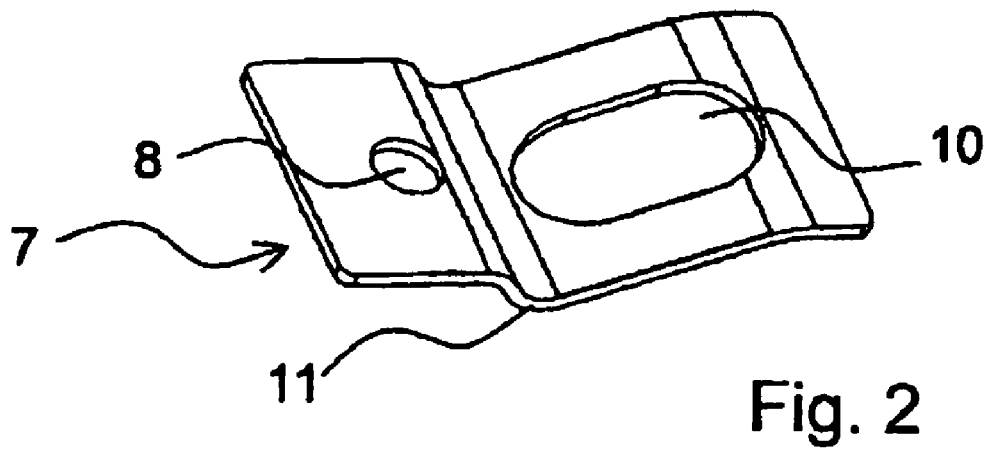
FIG. 2 shows a retaining flap.
Figure 3:
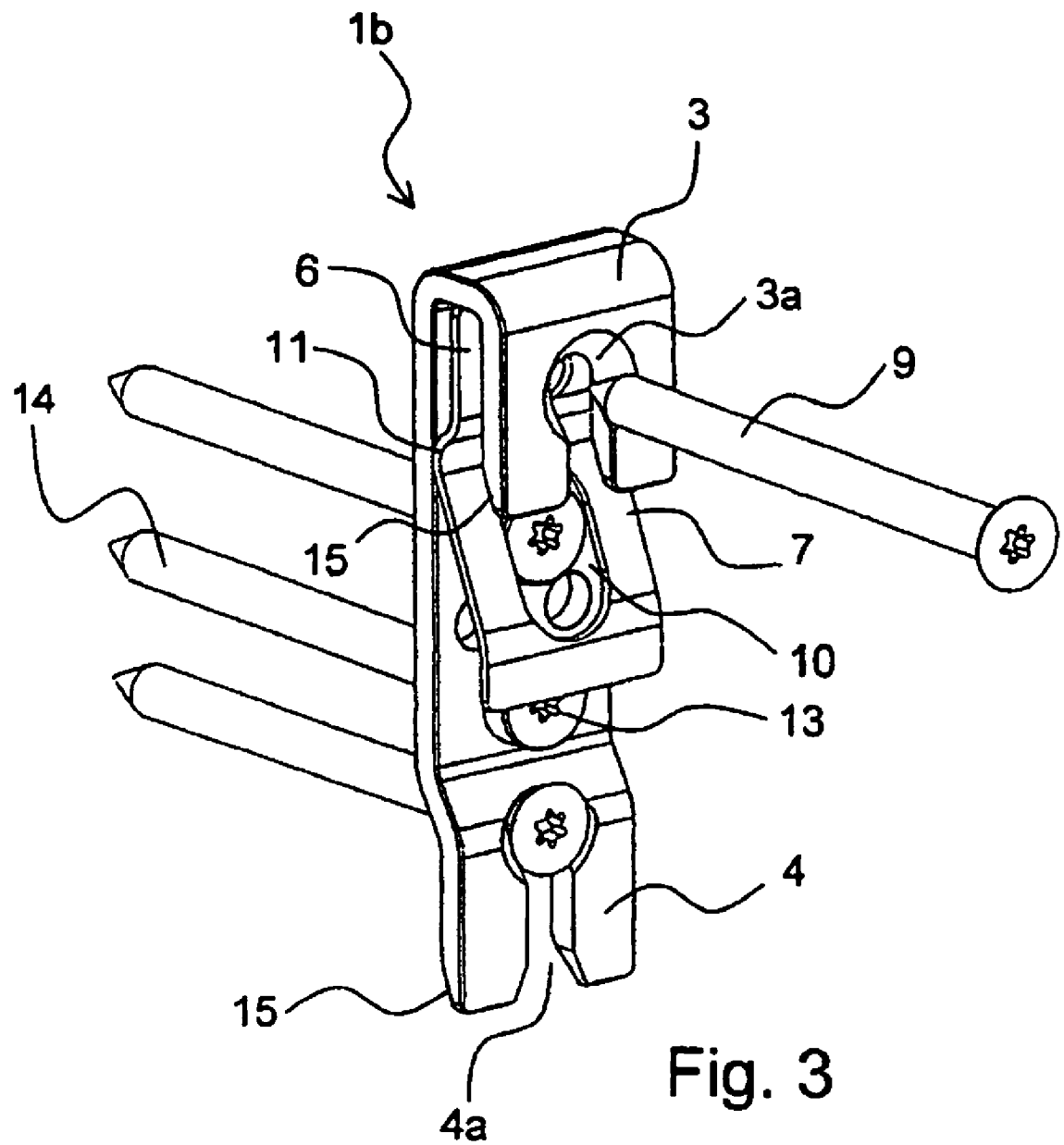
FIG. 3 shows the arrangement of the retaining flap

FIG. 2 shows a plate-shaped retaining flap 7 with a holding recess 8 for a fastening screw 9 (shown in FIG. 3). In the position opposite the holding recess 8, in the direction of the longitudinal axis of the retaining flap 7, a second, larger holding recess 10 is produced. A swivel-point support 11 is formed between the holding recesses 8 and 10 in a transverse axis of the retaining flap 7 next to fastening hole 8. In this example, the swivel-point support 11 is formed by a curvature. It is clear to the person skilled in the art that the swivel-point support may also be produced by other measures, such as, e.g., a thickening of the material.

FIG. 3 shows the arrangement of retaining flap 7 in the inside space 6 created the bend of fitment half 1b when fastening screw 9 is inserted in holding recess 8 of retaining flap 7, while additional fastening screws 14 for the subsequent fastening are already inserted up to screw head 13 in fastening holes 5 of fitment half 1b.

Figure 4A:
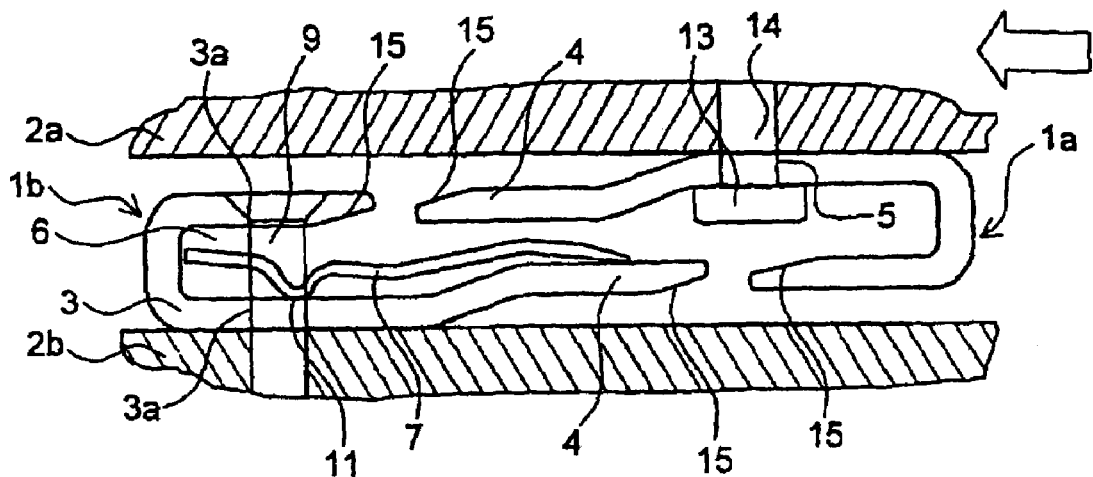
FIGS. 4A, 4B, 4C show the functional principle of the joining means.
Figure 4B:
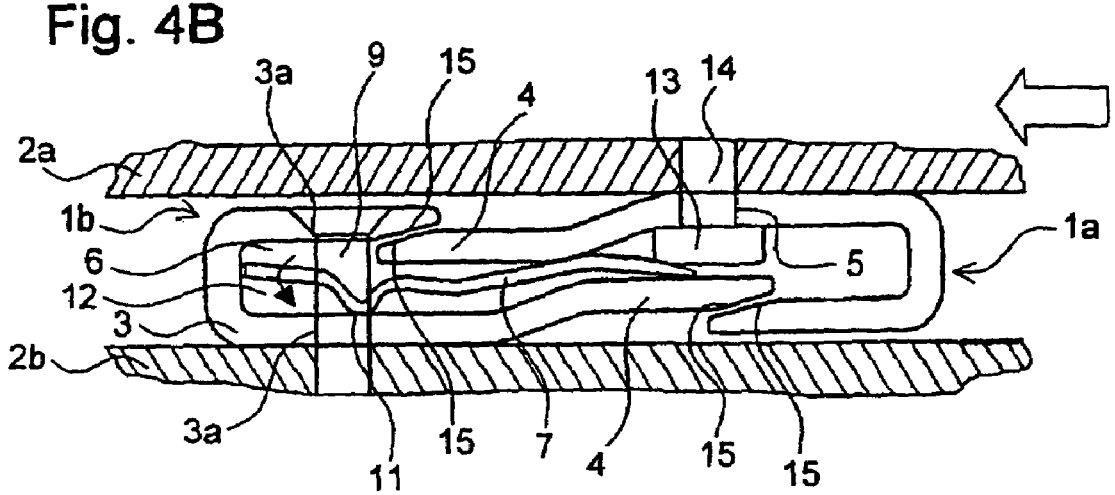
Figure 4C:
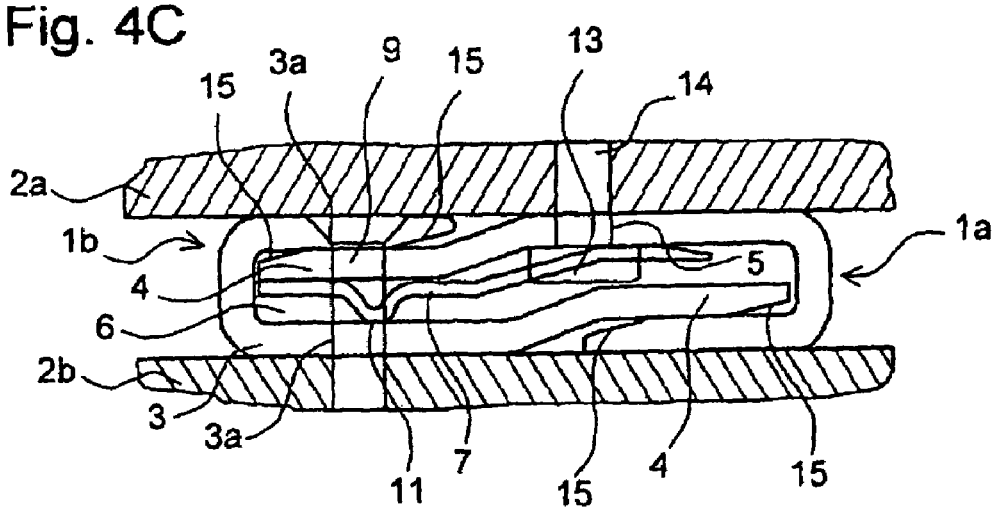

FIGS. 4A, 4B and 4C show the functional principle of the joining means. As FIG. 4A shows, the fitment halves 1a, 1b are each solidly arranged on structural parts 2a, 2b by fastening screws (14, 9). In order to produce the form-fitting joining between fitment halves 1a, 1b, structural parts 2a, 2b are moved in the longitudinal direction relative to one another until the fitment halves are engaged equally and opposite one another, as is shown in FIG. 4B. Upon further introducing the cropped end segment 4 of fitment half 1a into the bend space 6 of fitment half 1b with retaining flap 7, the retaining flap folds down in the direction 12 of the arrow in swivel-point support 11 around the transverse axis and encloses with the second holding recess 10 (see FIG. 2) the screw head 13 of a fastening screw 14 for attaching to the other fitment half 1a. This state of joining is shown as the locked position in FIG. 4C and reliably prevents a loosening of the joining in all directions.

Figure 5:
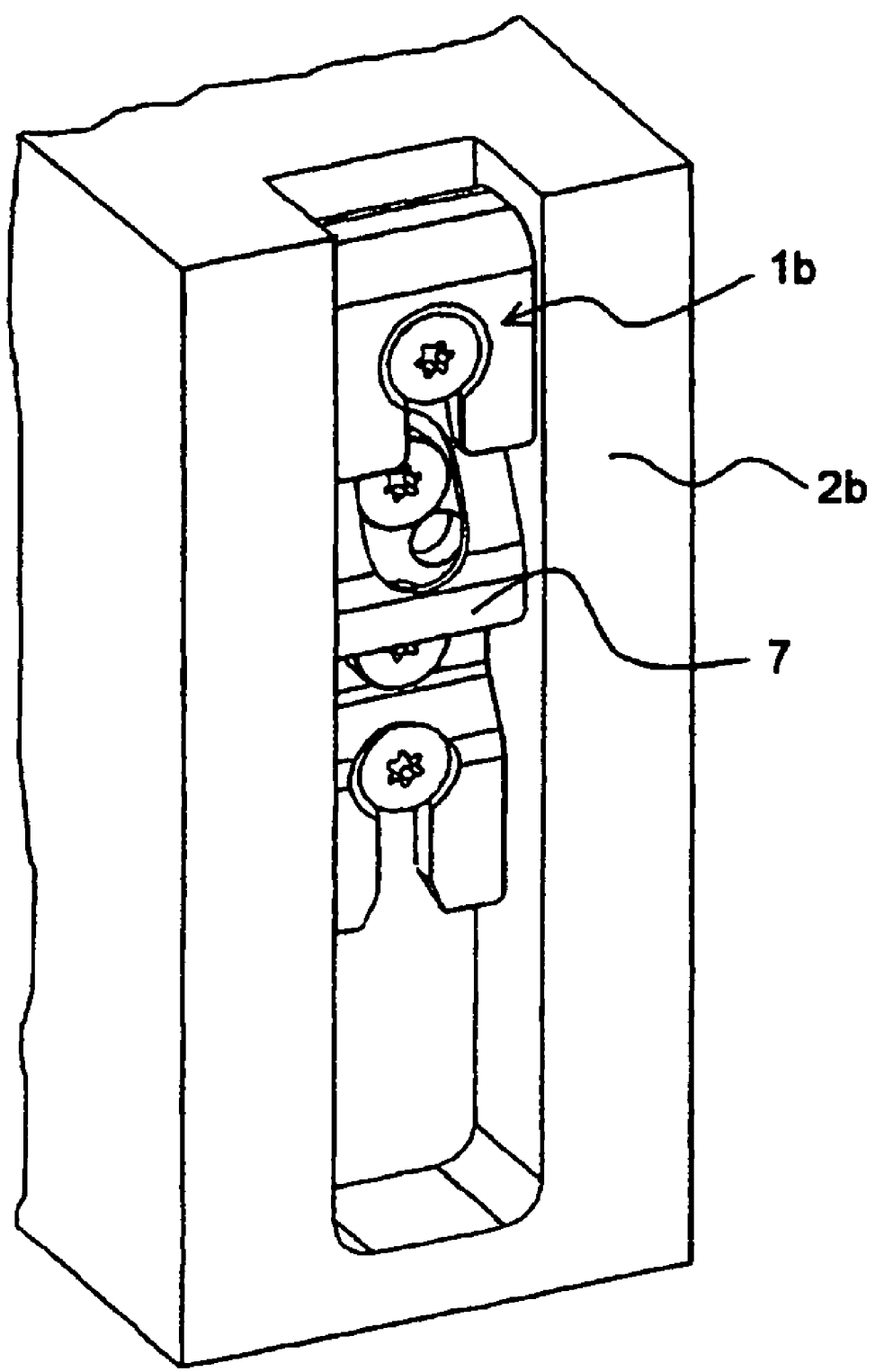
FIG. 5 shows an example of embodiment of the recessed arrangement of a fitment half.

FIG. 5 shows an example of embodiment of the recessed fastening of fitment half 1b with retaining flap 7 arranged in structural part 2b, whereby the other fitment half 1a must be attached jutting out on the structural part. This type of joining of structural parts is comparable to a joining by mortise and tenon and assures the optical masking of the joining means.

What is claimed is:

1. A fitment suitable for the form-fitting joining of two structural parts, said fitment comprising two fitment halves, wherein one of the two fitment halves is attached to one of the two structural parts and the other of the two fitment halves is attached to the other of the two structural parts and wherein one of the two fitment halves has elements that can be engaged with the other of the two fitment halves and that is adapted to effect the joining of the two structural parts, each of the two fitment halves being configured in plate shape, having one end segment with an attachment hole, this end segment being bent back around an angle of 180° to form a bend space and being longitudinally slotted, having another cropped end segment with a longitudinal slot, wherein a recess is provided at each slot end for the uptake of a screw head, and having at least one other fastening hole provided between end segments, said fitment further comprising a plate-shaped retaining flap arranged inside the bend space of a first of the two fitment halves, this plate-shaped retaining flap having the following features:

a first holding recess, in order to hold the plate-shaped retaining flap in the bend space of said first of the two fitment halves by means of a fastening screw, a second holding recess and a swivel-point support arranged between the first and the second holding recesses, whereby the plate-shaped retaining flap is dimensioned such that upon introducing the cropped end segment of a second of the two fitment halves into the bend space of said first of the two fitment halves, the plate-shaped retaining flap is tilted such that the second holding recess encloses the head of a fastening screw arranged in a fastening hole in said second of the two fitment halves.

2. The fitment according to claim 1, wherein each of the two fitment halves has parallelly aligned chamfers formed at the end segments of each fitment half to facilitate the coupling together of the two fitment halves when the two fitment halves are oppositely and equally engaged with one another.

3. The fitment according to claim 1 or 2, wherein the plate-shaped retaining flap is a permanent magnet.

* * * * *